United States Patent
Oh

(10) Patent No.: US 7,526,195 B2
(45) Date of Patent: Apr. 28, 2009

(54) DIGITAL PHOTOGRAPHING APPARATUS HAVING TWO DISPLAY PANELS, AND METHOD OF CONTROLLING THE SAME

(75) Inventor: Hyun-min Oh, Kimhae-si (KR)

(73) Assignee: Samsung Techwin Co., Ltd., Changwon (KR)

( * ) Notice: Subject to any disclaimer, the term of this patent is extended or adjusted under 35 U.S.C. 154(b) by 383 days.

(21) Appl. No.: 11/289,190

(22) Filed: Nov. 29, 2005

(65) Prior Publication Data

US 2006/0210263 A1  Sep. 21, 2006

(30) Foreign Application Priority Data

Mar. 15, 2005  (KR) .................... 10-2005-0021376

(51) Int. Cl.
*G03B 17/18* (2006.01)
(52) U.S. Cl. .................. 396/287; 396/348; 348/333.06
(58) Field of Classification Search ................. 396/281, 396/287, 348, 374, 383, 429; 348/333.01, 348/333.06, 373, 375
See application file for complete search history.

(56) References Cited

U.S. PATENT DOCUMENTS

| | | | |
|---|---|---|---|
| 6,191,938 B1 * | 2/2001 | Ohgami et al. .............. 361/681 |
| 6,393,222 B1 | 5/2002 | Nakagawa et al. |
| 6,956,540 B1 * | 10/2005 | Yoshihara et al. ............ 345/1.1 |
| 7,042,711 B2 * | 5/2006 | Tanaka et al. ................ 361/679 |
| 7,046,286 B1 * | 5/2006 | Kobayashi et al. ..... 348/333.06 |
| 2001/0004269 A1 * | 6/2001 | Shibata et al. ......... 348/333.06 |
| 2003/0064688 A1 * | 4/2003 | Mizuta et al. .................. 455/90 |
| 2004/0119876 A1 | 6/2004 | Ohmori et al. |
| 2006/0050151 A1 * | 3/2006 | Fujinawa ................ 348/207.99 |
| 2006/0050168 A1 * | 3/2006 | Okada et al. ........... 348/333.06 |
| 2006/0061695 A1 * | 3/2006 | Endo .......................... 348/739 |

FOREIGN PATENT DOCUMENTS

| | | |
|---|---|---|
| JP | 2001-128039 A | 5/2001 |
| JP | 2005-086283 A | 3/2005 |

* cited by examiner

Primary Examiner—William B Perkey
(74) Attorney, Agent, or Firm—Drinker Biddle & Reath LLP

(57) ABSTRACT

A digital photographing apparatus includes: a first display panel; and a second display panel which performs a first motion that moves the second display panel between a first position, where the second display panel covers the first display panel, and a second position, where the first display panel is exposed, and performs a second motion in a generally perpendicular direction to the first motion.

18 Claims, 8 Drawing Sheets

DIGITAL PHOTOGRAPHING APPARATUS HAVING TWO DISPLAY PANELS, AND METHOD OF CONTROLLING THE SAME

BACKGROUND OF THE INVENTION

This application claims the priority of Korean Patent Application No. 10-2005-0021376, filed on Mar. 15, 2005 in the Korean Intellectual Property Office, the disclosure of which is incorporated herein in its entirety by reference.

1. Field of the Invention

The present invention relates to a digital photographing apparatus and a method of controlling the same, and more particularly, to a digital photographing apparatus having two display panels and a method of controlling the same.

2. Description of the Related Art

A conventional digital photographing device, for example, the device disclosed in U.S. Patent Publication No. 119,876 filed in 2004, entitled "Method of Notification of Inadequate Picture Quality," includes a single display panel that can be used in a photographing mode or a play mode.

A simple editing operation such as enlargement, reduction, and conversion to and from black and white can be performed in photographing devices without having to transfer an image to a universal computer due to improved capabilities and increased capacity of embedded memories. In addition, various special modes are available, such as a panorama mode, which enables photographing of panoramic views. However, it is difficult to edit and photograph images using only one display panel.

SUMMARY OF THE INVENTION

The present invention provides a digital photographing apparatus having two display panels.

The present invention also provides a method of controlling a digital photographing apparatus having two display panels.

According to an aspect of the present invention, there is provided a digital photographing apparatus including: a first display panel; and a second display panel which performs a first motion to cover or expose the first display panel and a second motion generally perpendicular to the first motion.

The first display panel may move within a predetermined range in a forward or backward direction to or from a rear surface of the digital photographing apparatus. The first display panel moves forward when the first display panel is exposed by the second display panel moving in the first motion, and the first display panel is pressed by the second display panel and moves backward when the first display panel is covered by the second display panel moving in the first motion.

According to another aspect of the present invention, there is provided a method of controlling a digital photographing apparatus including a first display panel and a second display panel which performs a first motion to cover or expose the first display panel and a second motion that is generally perpendicular to the first motion, and includes various modes such as a preview mode, a photograph mode, and a play mode. The method includes: determining a present mode of the digital photographing apparatus; determining the present positions of the first and second display panels; driving at least the second display panel according to default settings depending on the determined present mode and the positions of the first and second display panels; and turning "on" or "off" the first and second display panels.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. Hereinafter, the present invention will be described referring to a digital camera as one example of a digital photographing apparatus for convenience of explanation. Thus, the present invention is not limited to the digital camera.

Figure 1:
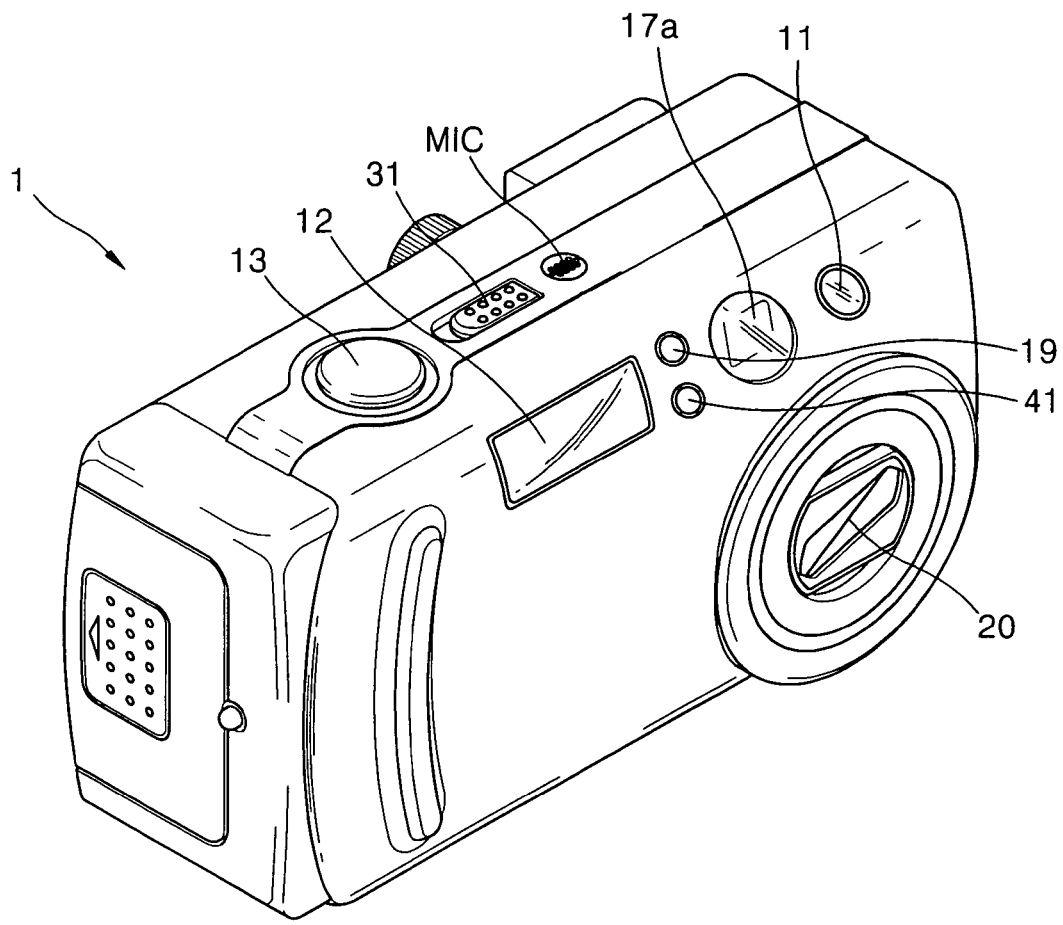
FIG. 1 is a perspective view of a front and top side of a digital camera, which is one example of a digital photographing apparatus, according to an embodiment of the present invention.

Referring to FIG. 1, a self-timer lamp 11, a flash 12, a viewfinder 17a, a flash light sensor (FS) 19, a lens 20, and a remote receiver 41 are placed on the front of a digital camera 1, which is a digital photographing apparatus, according to an embodiment of the present invention. A microphone MIC, a shutter release button 13, and a power switch 31 are placed on the top of the digital camera 1.

The self-timer lamp 11 operates for a predetermined amount of time after the shutter release button 13 is pressed until an image is captured when in a self-timer mode. The FS 19 senses the amount of ambient light when the flash 12 operates, and inputs the amount of ambient light into a digital camera processor (DCP) 507 (see FIG. 6) via a micro-controller 512 (see FIG. 6). The remote receiver 41 receives a command signal (e.g., a photographing command signal) from a remote control (not shown), and inputs the command signal into the DCP 507 via the micro-controller 512.

The shutter release button 13 has a two-step structure. That is, after a user presses a wide-angle zoom button $39_W$ (see FIG. 2) and a telephoto zoom $39_T$ (see FIG. 2), if the user presses the shutter release button 13 to a first step, a S1 signal from the shutter release button 13 is turned "on," and if the shutter release button 13 is pressed to a second step, a S2 signal from the shutter release button 13 is turned "on."

Figure 2:
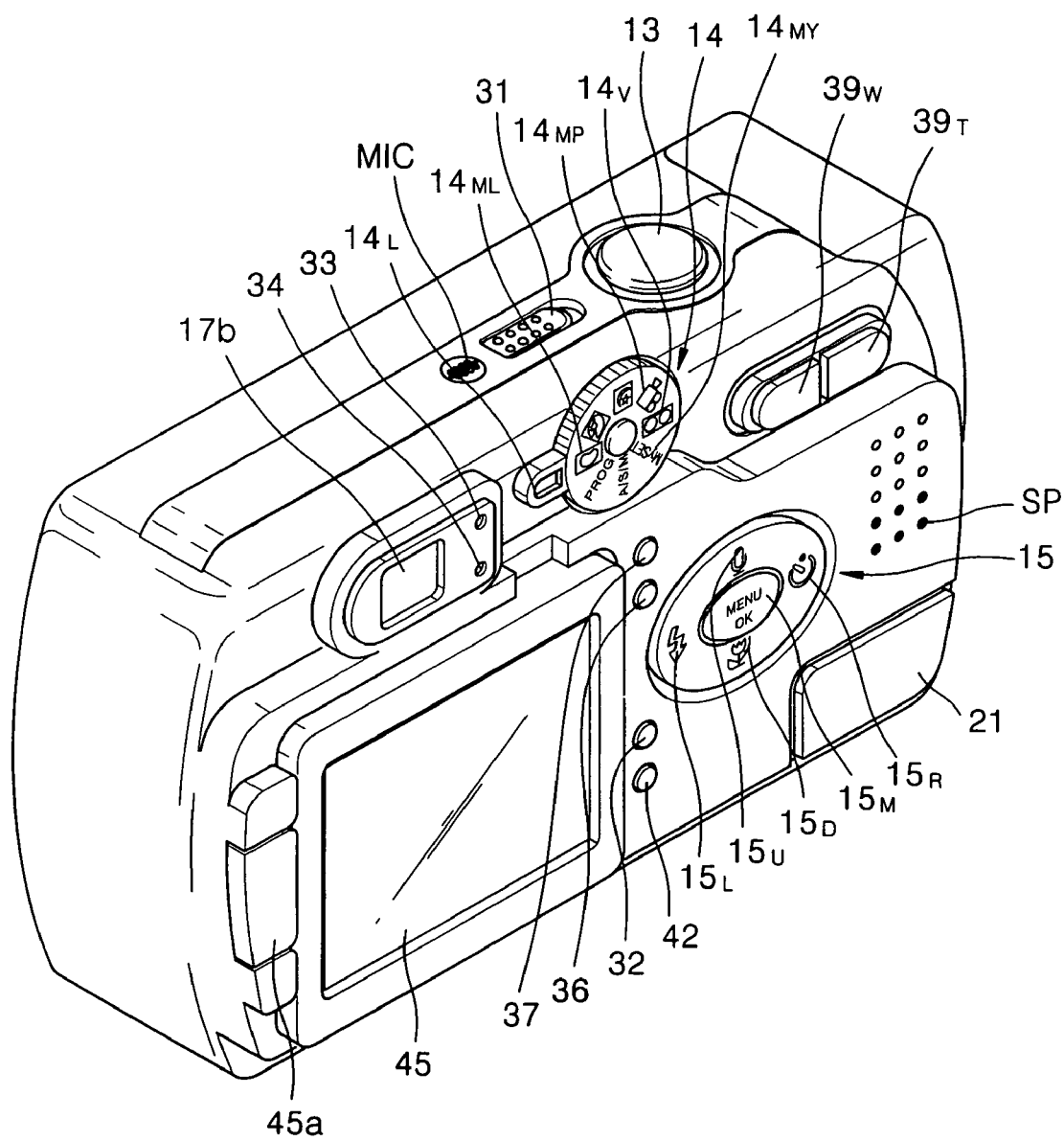
FIG. 2 is a perspective view of a rear and top side of the digital camera in FIG. 1, illustrating a first display panel arrangement.
Figure 3:
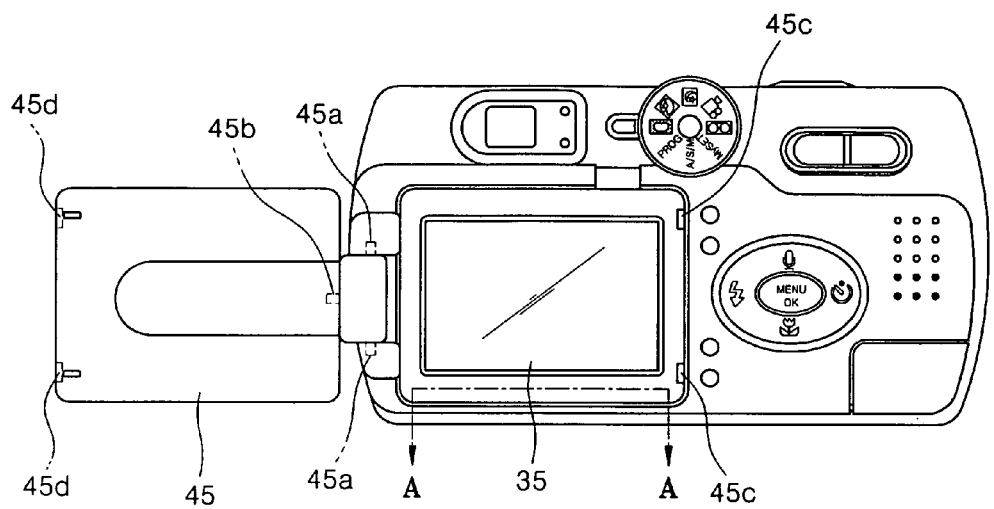
FIG. 3 is a rear view of the digital camera in FIG. 1, illustrating a second display panel arrangement.

Referring to FIGS. 2 and 3, unlike a conventional digital camera which has a single liquid crystal display (LCD) panel, the digital camera 1 of the present invention includes two LCD panels, a first LCD panel 35 and a second LCD panel 45.

The first LCD panel 35 is disposed at the rear of the digital camera 1, as in the conventional digital camera, and the second LCD panel 45 is disposed to be able to perform a first motion to cover or expose the first LCD panel 35, and a second motion in a generally perpendicular direction with respect to the first motion.

Examples of the second LCD panel 45 installed to be able to perform the first and second motions are illustrated in FIGS. 2 through 5. For example, a first hinge 45a supports a first rotation motion of the second LCD panel 45 and a second hinge 45b supports a second rotation motion of the second LCD panel 45. Since the first and second hinges 45a and 45b and their use for a display panel for a camcorder or a rotatable LCD panel in digital cameras are well known, their description will be omitted.

In another example of the second LCD panel 45 capable of moving to cover or expose the first LCD panel 35, the second LCD panel 45 slides over the first LCD panel 35 along a guide installed near the first LCD panel 35. This motion is similar to the sliding motion in some mobile phones, and thus its detailed description will be omitted.

There are various ways to perform the first and second motions of the second LCD panel 45 in addition to a rotation motion by the first and second hinges 45a and 45b, and a sliding motion along the guide. The motions used in the present invention can be any motions so long as the first LCD panel 35 is covered or exposed through the first motion and the second motion is a generally perpendicular motion to the first motion.

When using the first and second hinges 45a and 45b illustrated in FIGS. 2 through 5, the second LCD panel 45 can move from the position illustrated in FIG. 2 to the position illustrated in FIG. 3, and any positions inbetween. Likewise, the second LCD panel 45 can move from the position illustrated in FIG. 4 to the position illustrated in FIG. 5 and any positions inbetween. However, in order to move from the position illustrated in FIG. 2 to the position illustrated in FIG. 4, for example, the second LCD panel 45 needs to move to the position illustrated in FIG. 3 first through the first motion, and then move to the position illustrated in FIG. 4 through the second motion. Thus, both the first and second motions are required.

Meanwhile, the first LCD panel 35 can be fixed to a main body of the digital camera 1.

Alternatively, the first LCD panel 35 may be movably installed on the digital camera 1 so that it can move forward or backward to or from the rear surface of the digital camera 1. For example, the first LCD panel 35 may move within a predetermined range in a direction towards or away from the rear surface of the digital camera 1. When the first LCD panel 35 is exposed as the second LCD panel 45 moves in the first motion, the first LCD panel 35 moves forward towards the rear surface of the digital camera 1. When the first LCD panel 35 is covered as the second LCD panel 45 moves in the first motion moving in the opposite direction to the previous first motion to expose the first LCD panel 35, the display screen of the first LCD panel 35 is pressed by the second LCD panel 45, and thus the first LCD panel 35 moves backwards from the rear surface of the digital camera 1.

Figure 4:
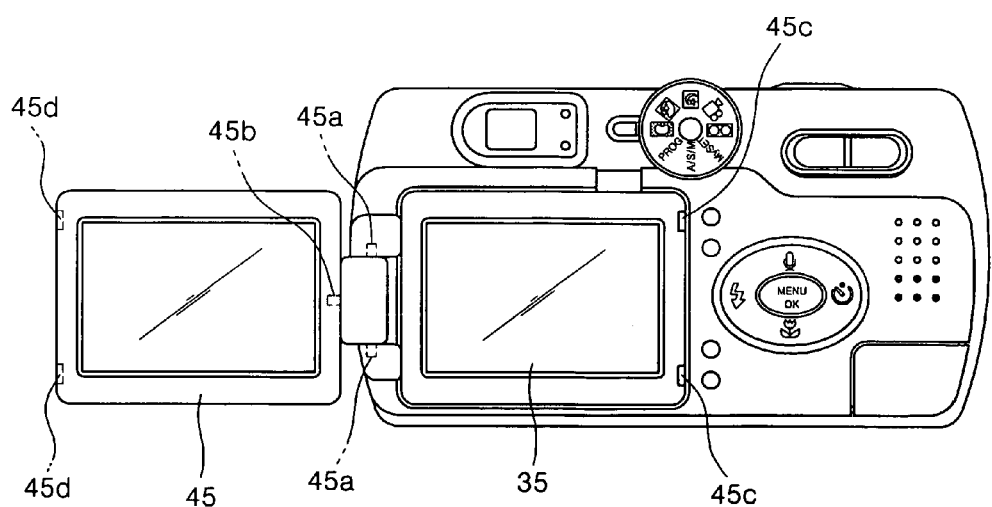
FIG. 4 is a rear view of the digital camera in FIG. 1, illustrating a third display panel arrangement.

The first LCD panel 35 moves forward towards the rear surface of the digital camera 1 when the first LCD panel 35 is exposed by the second LCD panel 45 moving in the first motion. The display screen of the first LCD panel 35 and a display screen of the second LCD panel 45 are substantially aligned with each other, as illustrated in FIG. 4, when the display screen of the second LCD panel 45 has moved to face in the same direction as the direction the display screen of the first LCD panel 35 faces. This can be achieved by including a component such as a stopper (not shown) for limiting the range of the forward motion of the first LCD panel 35. One of ordinary skill in the art to which the present invention pertains can configure such a component in many ways. In addition, a guide (not shown) may be included so that the forward and backward movement of the first LCD panel 35 can be performed along a certain path. For example, grooves (not shown) may be formed on sides of the first LCD panel 35 and protrusions corresponding to the grooves may be formed on the digital camera 1. Conversely, the grooves may be formed on the digital camera 1 and the protrusions may be formed on the sides of the first LCD panel 35.

As illustrated in FIG. 3 or 4, protruding stoppers 45c may be formed on the digital camera 1 and grooved stoppers 45d coupled to the protruding stoppers 45c may be formed on the second LCD panel 45 to fix the second LCD panel 45 at a location where it covers the first LCD panel 35. The protruding stoppers 45c may also act as the stopper which limits the range of the forward motion of the first LCD panel 35.

Figure 8:
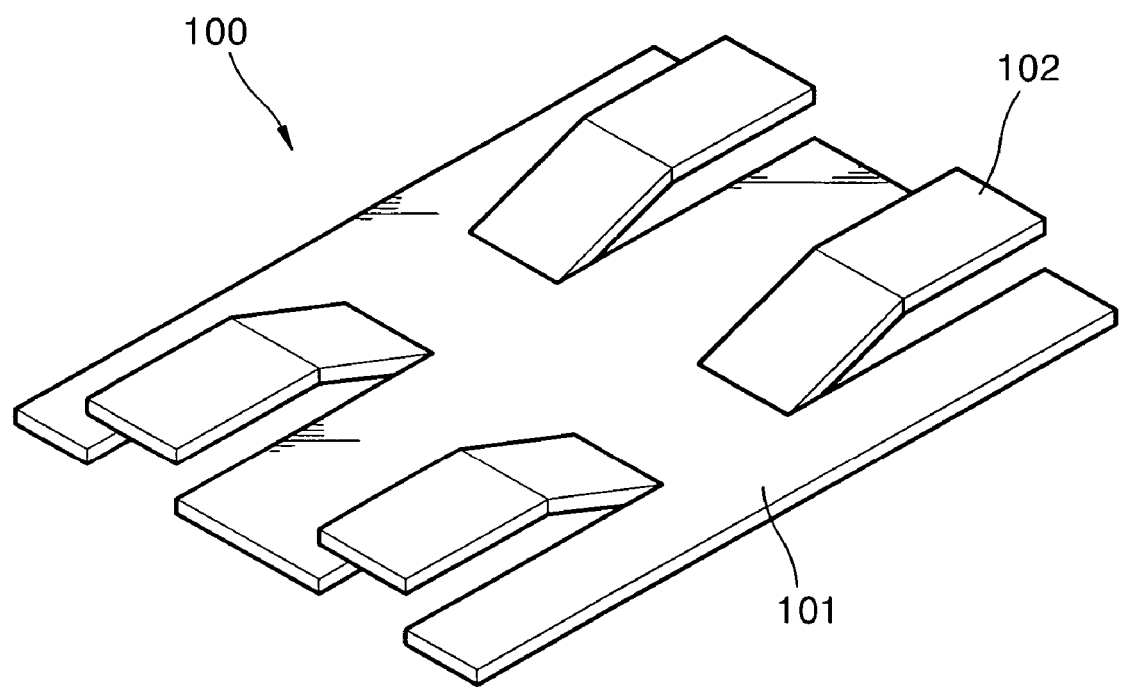
FIG. 8 is a perspective view of an elastic element in the digital camera illustrated in FIG. 3.

An elastic element (not shown) may be disposed between the first LCD panel 35 and the digital camera 1 so that the display screen of the first LCD panel 35 moves forward by the force of the elastic element when the second LCD panel 45 exposes the first LCD panel 35. Conversely, the display screen of the first LCD panel 35 can move backward as the elastic element contracts when the second LCD panel 45 presses and covers the first LCD panel 35. As an example, the elastic element may be a plate spring 100 illustrated in FIG. 8. A lower portion 101 of the elastic element is fixed to a surface of the digital camera 1 which faces the rear surface of the first LCD panel 35 and has elastic portions 102, each having a predetermined moving range and is formed to contact the rear surface of the LCD panel 35.

Figure 9:
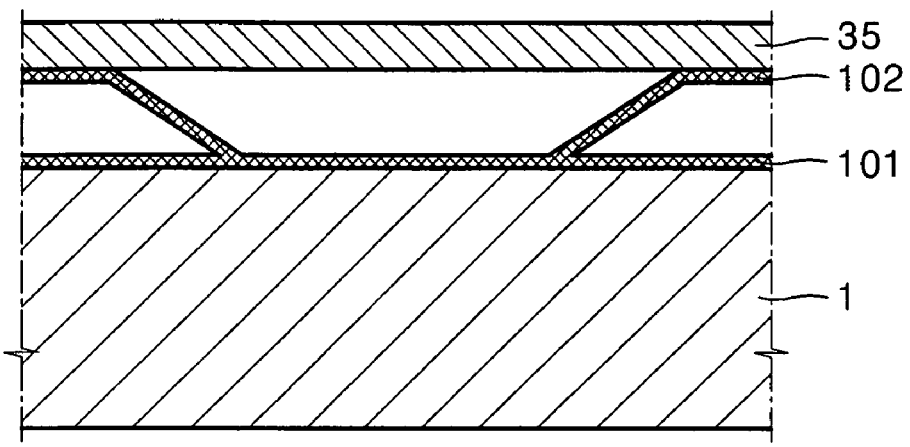
FIG. 9 is a schematic cross-sectional view of the digital camera in FIG. 3 taken along line A-A in FIG. 3.
Figure 10:
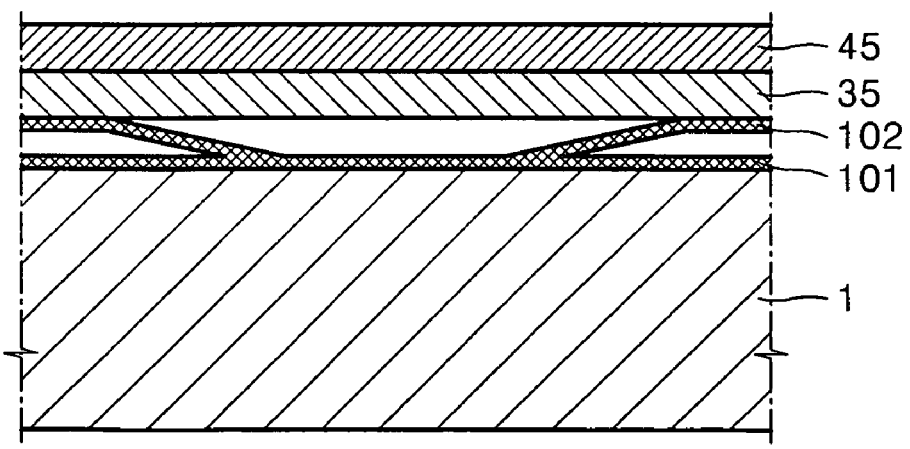
FIG. 10 is a cross-sectional view of the digital camera in FIG. 3 taken along line B-B in FIG. 5.

FIG. 9 is a schematic cross-sectional view of the digital camera 1 taken along line A-A in FIG. 3. Referring to FIG. 9, the first LCD panel 35 is in a location reached after moving forward by the elastic force of the plate spring 100. Meanwhile, FIG. 10 is a cross-sectional view of the digital camera 1 taken along line B-B in FIG. 5. Referring to FIG. 10, the elastic force of the plate spring 100 is restricted by the second LCD panel 45 pressing the first LCD panel 35, and thus the first LCD panel 35 is moved backward. The elastic element may be made of a common elastic material.

The first and second LCD panels 35 and 45 may be common display panels (e.g., OLEDs, and PDPs), and not always LCD panels.

As illustrated in FIG. 2, a mode dial 14, function buttons 15, a manual-focus/delete button 36, a manual-adjust/play/stop button 37, a play mode button 42, a speaker SP, an LCD control button 32, an automatic-focus lamp 33, a viewfinder 17b, a flash standby lamp 34, the first and second LCD panels 35 and 45, a wide-angle zoom button $39_W$, a telephoto zoom button $39_T$, and an external interface unit 21 are placed on the rear of the digital camera 1.

The mode dial 14 is used to select an operating mode among a plurality of operating modes of the digital camera 1. The plurality of operating modes may include, for example, a simple image photographing mode, a program image photographing mode, a portrait image photographing mode, a night scene image photographing mode, a manual image photographing mode, a moving picture photographing mode $14_{MP}$, a user setting mode $14_{MY}$, and a recording mode $14_V$.

For reference, the user setting mode $14_{MY}$ is an operating mode in which the user sets photographing settings needed for each image photographing mode.

The recording mode $14_V$ is an operating mode in which only sounds, for example, the user's voice, are recorded. When the user presses the shutter release button 13 while in the recording mode $14_V$, an audio file is created in a memory card, which is a storage medium, and input audio data is stored in the audio file. When the user presses the shutter release button 13 again, the storing of the input audio data stops, and the audio file is completed.

The function buttons 15 are used to perform specific functions of the digital camera 1 as well as to change the direction of an activated cursor on a menu screen of the first and second LCD panels 35 and 45. An example of each function of the function buttons 15 will now be described in detail.

If the user presses a self-time/right button $15_R$ when an image presently displayed in a play mode is not enlarged, the next file in the forward direction is displayed. If the user presses the self-time/right button $15_R$ when an image presently displayed in the play mode is enlarged, the displayed region of the enlarged image moves to the right. If the user presses the self-time/right button $15_R$ in a preview mode, a self-timer mode in which a photograph is taken automatically after a predetermined amount of time, for example, 10 seconds, is performed.

If the user presses a flash/left button $15_L$ when the presently displayed image is not enlarged in the play mode, the next file in the reverse direction is displayed. If the user presses the flash/left button $15_L$ when an image presently displayed in the play mode is enlarged, the displayed region of the enlarged image moves to the left. The user may select a flash mode for the image photographing modes by pressing the flash/left button $15_L$ in the preview mode.

If the user presses a macro/down $15_D$ when the presently displayed image is enlarged in the play mode, the displayed region of the enlarged image moves downwards. The user sets near automatic focusing for the image photographing modes by pressing the macro/down $15_D$ in the preview mode.

If the user presses an audio-memo/up button $15_U$ when the presently displayed image is enlarged in the play mode, the displayed region of the enlarged image moves upwards. If the user presses the audio-memo/up $15_U$ in the preview mode, the user can record audio for a predetermined amount of time, for example, 10 seconds, after the photographing operation.

When the user presses a menu/select-confirm button $15_M$ when the active cursor highlights one of a plurality of selection categories in a setting mode that is changed from the preview mode, an operating condition that corresponds to the selected selection category can be changed.

The manual-adjust/play/stop button 37 is used to manually adjust particular conditions. Also, if the user presses the manual-adjust/play/stop button 37 when a moving picture file is selected in the play mode, the selected moving picture file is reproduced or stopped.

The manual-focus/delete button 36 is used to manually focus or delete an image in the image photographing mode.

The LCD control button 32 is used to control the operation of the first and second LCD panels 35 and 45. For example, power supplied to the first and second LCD panels 35 and 45 is controlled by the number of times the LCD control button 32 is pressed, and both the first and second LCD panels 35 and 45 may be turned "on" or "off" or one of the first and second LCD panels 35 and 45 may be turned "on".

The play mode button 42 is used to convert to the play mode or the preview mode.

The automatic-focus lamp 33 is operated when the digital camera 1 is well focused. The flash standby lamp 34 is operated when the flash 12 (see FIG. 1) is in a standby mode. A mode indicating lamp $14_L$ indicates a selected mode of the mode dial 14.

Figure 6:
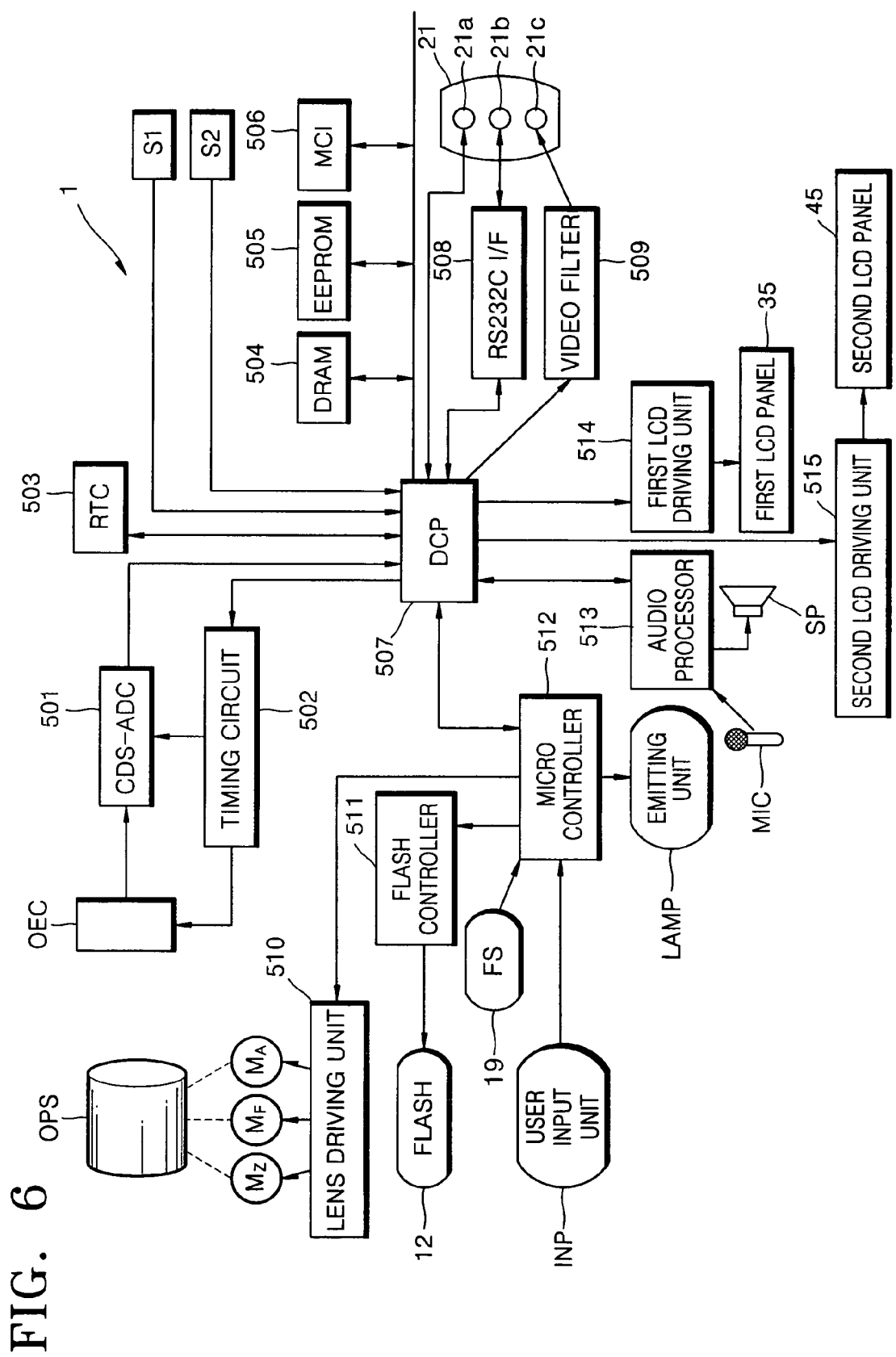
FIG. 6 is a block diagram of the digital camera in FIG. 1.

FIG. 6 is a block diagram of the digital camera 1 in FIG. 1. Referring to FIGS. 1, 2, and 6, the overall structure and operation of the digital camera 1 will now be described.

An optical system OPS that includes a lens unit (not shown) and a filter unit (not shown) optically processes light reflected from a subject to be photographed.

The lens unit of the optical system OPS includes a zoom lens, a focus lens, and a compensation lens.

When the user presses the wide-angle zoom button $39_W$ or the telephoto zoom button $39_T$ included in a user input unit INP, a signal corresponding to the wide-angle zoom button $39_W$ or the telephoto zoom button $39_T$ is input to the micro-controller 512. Accordingly, as the micro-controller 512 controls a lens driving unit 510, a zoom motor $M_Z$ is driven and moves the zoom lens. That is, when the wide-angle zoom button $39_W$ is pressed, the focal length of the zoom lens is shortened, and thus the viewing angle is decreased. Alternatively, when the telephoto zoom button $39_T$ is pressed, the focal length of the zoom lens is lengthened, and thus the viewing angle is increased. The location of the focus lens is adjusted after the location of the zoom lens is set. Therefore, the viewing angle is hardly affected by the location of the focus lens.

In an automatic focusing mode, a main controller (not shown) included in the DCP 507 controls the lens driving unit 510 via the micro-controller 512, and thus a focus motor $M_F$ is operated. Accordingly, the focus lens moves, and in this process, the location of the focus lens at which a high frequency component of an image signal is most increased, for example, a number of steps of the focus motor $M_F$, is set.

The compensation lens of the optical system OPS compensates the overall refractive index of the optical system OPS, and thus is not operated separately. A motor $M_A$ drives an aperture (not shown).

At the filter unit of the optical system OPS, an optical low pass filter removes optical noise from high frequency components of incident light, and an infra-red cut filter blocks infra-red components of incident light.

A photoelectric converter OEC of a charge-coupled device (CCD) or a complementary metal oxide semiconductor (CMOS) (not shown) converts light received from the optical system OPS into electrical analog signals. Here, the DCP 507 controls a timing circuit 502 to control the operation of the photoelectric converter OEC and a correlation double sampler and analog-to-digital converter (CDS-ADC) 501. The CDS-ADC 501 processes the analog signals received from the photoelectric converter OEC, and converts them into digital signals after removing high frequency noise and altering their bandwidth.

A real-time clock 503 provides time information to the DCP 507. The DCP 507 processes the digital signals output from the CDS-ADC 501, and generates digital image signals that are divided into brightness and chromaticity signals.

An emitting unit LAMP that is operated by the micro-controller 512 according to control signals received from the DCP 507 including the main controller includes the self-timer lamp 11, the automatic-focus lamp 33, the mode indicating lamp $14_L$, and the flash standby lamp 34. The user input unit INP includes the shutter release button 13, the mode dial 14, the function buttons 15, the LCD control button 32, the manual-focus/delete button 36, the manual/adjust/play/stop button 37, the wide-angle zoom button $39_W$, and the telephoto zoom button $39_T$.

The digital image signal transmitted from the DCP 507 is temporarily stored in a dynamic random access memory (DRAM) 504. Algorithm and setting information needed for the operation of the DCP 507 is stored in an electrically erasable and programmable read-only memory (EEPROM) 505. A removable memory card is inserted into a memory card interface (MCI) 506.

The digital image signals output from the DCP 507 can be transmitted in series via a universal serial bus (USB) connector 21a or an RS232C interface 508 and its connector 21b, or can be transmitted as video signals via a video filter 509 and a video outputting unit 21c. Here, the DCP 507 includes a main controller embedded therein.

An audio processor 513 outputs audio signals from a microphone MIC to the DCP 507 or a speaker SP, and outputs audio signals from the DCP 507 to the speaker SP.

Meanwhile, the micro-controller 512 operates the flash 12 by controlling the operation of a flash controller 511 according to a signal output from the FS 19.

The digital signals output from the DCP 507 are input to a first LCD panel driving unit 514 and/or a second LCD panel driving unit 515 to display an image on the first LCD panel 35 and/or the second LCD panel 45. The image is displayed on the first LCD panel 35 and/or the second LCD panel 45 according to a default setting depending on the present mode of the digital camera 1 and the positions of the first and second LCD panels 35 and 45.

For example, when the digital camera 1 is in the enlarge/reduce mode while the first and second LCD panels 35 and 45 are positioned as illustrated in FIG. 4, an original image is displayed on the second LCD panel 45 at the left and an enlarged or reduced image is displayed on the first LCD panel 35 at the right. This also applies when the digital camera 1 is in an editing mode. The positions of the first and second LCD panels 35 and 45 as illustrated in FIG. 4 are useful when enlarging, reducing, and editing an image since an original image, and an enlarged, reduced, or edited image can be compared at the same time. Also, it is possible to display a photographed image on each of the first and second LCD panels 35 and 45 during a play mode and compare the two images. The panel positions as illustrated in FIG. 4 may be useful when photographing a panoramic view since they help determine the photographing angle by comparing the previously taken image and a present preview image. In addition, when the panels are positioned as illustrated in FIG. 3, the same preview image may be displayed on the first and second LCD panels 35 and 45 so that when a subject is a person, the person can pose while looking at a preview image of himself/herself displayed on the second LCD panel 45.

Figure 7:
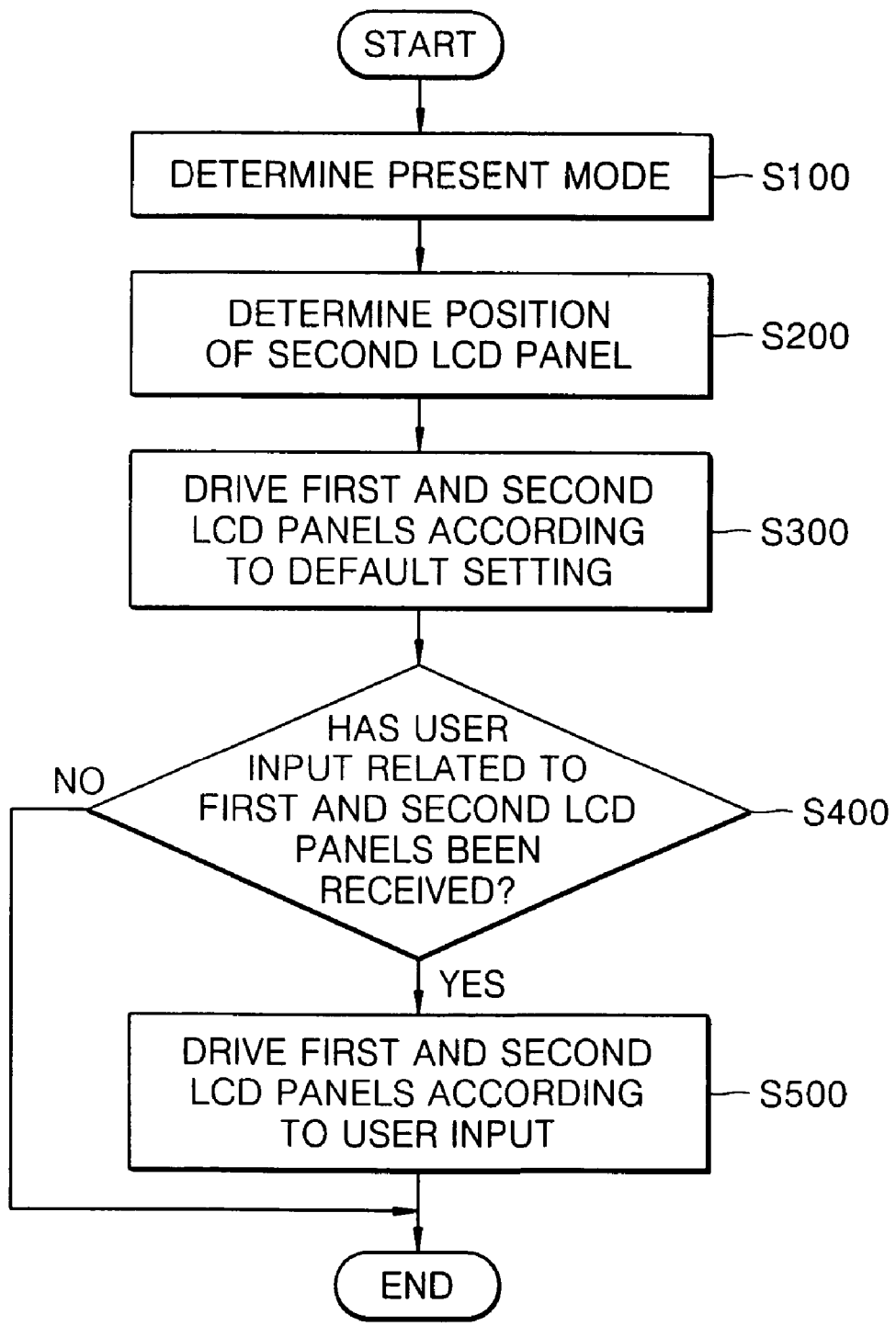
FIG. 7 is a flow chart illustrating a method of controlling first and second LCD panels of the digital camera in FIG. 1.

FIG. 7 is a flow chart illustrating a method of controlling the first and second LCD panels 35 and 45 of the digital camera 1.

First, the DCP 507 determines the present mode of the digital camera 1 (S100). Thereafter, the DCP 507 determines the position of the display panels, specifically, the second LCD panel 45 (S200). The determining of the position of the second LDC panel 45 can be performed by, for example, a first sensor S1 (see FIG. 6) installed to correspond to the first hinge 45a and a second sensor S2 (see FIG. 6) installed to correspond to the second hinge 45b. The DCP 507 can determine the position of the first and second LCD panels 35 and 45 from the signals output from the first and second sensors S1 and S2. Then, the first and second LCD panels 35 and 45 are turned "on" or "off" and driven (S300) according to a default setting depending on the present mode the digital camera 1 is in and the position of the first and second LCD panels 35 and 45.

Figure 5:
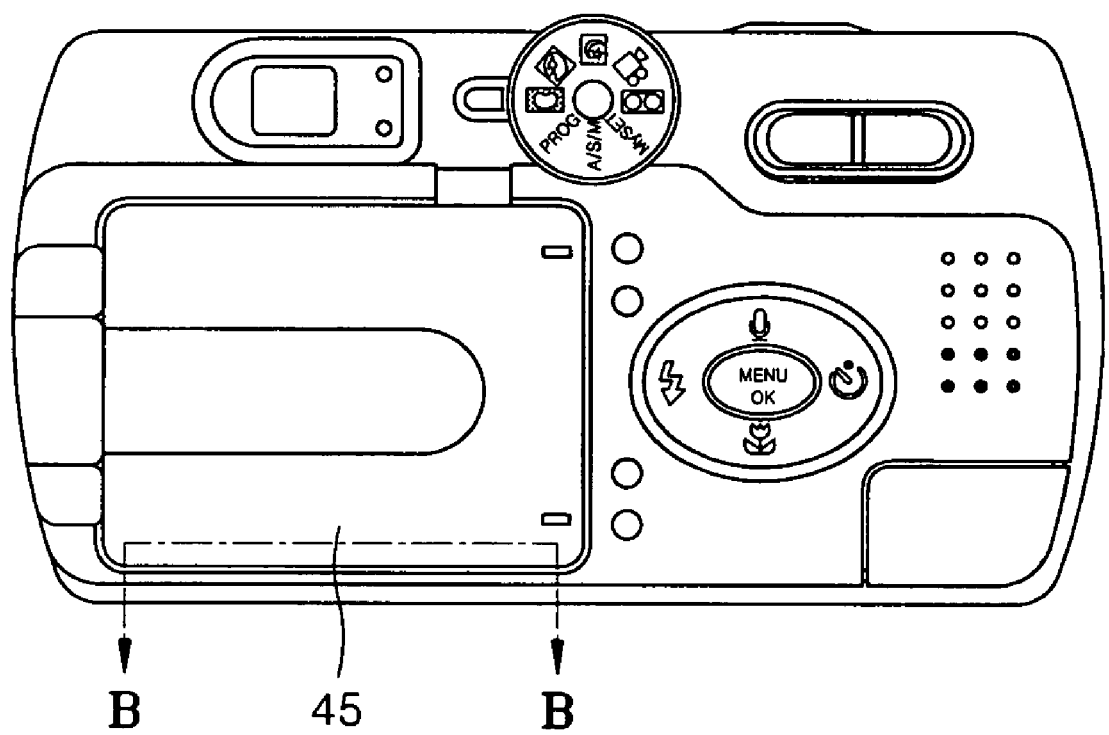
FIG. 5 is a rear view of the digital camera in FIG. 1, illustrating a fourth display panel arrangement.

For example, both the first and second LCD panels 35 and 45 are turned "off" when the DCP 507 determines by the first and second sensors S1 and S2 that the position of the second LCD panel 45 is as illustrated in FIG. 5. Alternatively, the first LCD panel 35 is turned "off" and the second LCD panel 45 is turned "on" when the DCP 507 determines by the first and second sensors S1 and S2 that the position of the second LCD panel 45 is as illustrated in FIG. 2. Alternatively, both the first and second LCD panels 35 and 45 are turned "on" when the DCP 507 determines by the first and second sensors S1 and S2 that the position of the second LCD panel 45 is as illustrated in FIG. 3 or 4. These examples did not consider the present mode the digital camera 1 is in. If the present mode the digital camera 1 is in is considered, more combinations are possible.

The display screens of the first and second LCD panels 35 and 45 are driven according to the default setting as described above, and a user is also given an additional option to select besides the default operations. The user may turn the first and second LCD panels 35 and 45 "on" or "off" and drive the first and second LCD panels 35 and 45 by inputting a separate option. Accordingly, the DCP 507 determines whether such a user input is received (S400), and, if there is a user input, turns the first and second LCD panels 35 and 45 "on" or "off" and drives the digital camera 1 according to the user input (S500). For example, the user may turn "on" or "off" the first or second LCD panel 35 or 45 by pressing the LCD control button 32. Also, the left and right display screens may be swapped by a pressing a certain button.

According to a digital photographing apparatus and a method of controlling the same of the present invention, the digital photographing apparatus is more convenient to use and has a larger range of practical applications since it can be used to enlarge, reduce, or edit an image even when photographing in various special modes such as a panorama mode.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital photographing apparatus comprising:
   a first display panel which moves toward or away from a geometric plane of a rear surface of the digital photographing apparatus; and
   a second display panel which performs a first motion that moves the second display panel between a first position, where the second display panel covers the first display panel, and a second position, where the first display panel is exposed, and performs a second motion in a generally perpendicular direction to the first motion.

2. The digital photographing apparatus of claim 1, wherein the first display panel, when exposed by the second display panel moving from the first position to the second position, moves toward the geometric plane of the rear surface of the digital photographing apparatus, and the first display panel moves away from the geometric plane of the rear surface of the digital photographing apparatus when pressed by the second display panel as the second display panel moves from the second position to the first position.

3. The digital photographing apparatus of claim 2, wherein a display screen of the first display panel and a display screen of the second display panel are aligned with each other in substantially the same geometric plane when the first display panel moves toward the geometric plane of the rear surface of the digital photographing apparatus when exposed by the second display panel moving from the first position to the second position and the display screen of the first display panel and the display screen of the second display panel are oriented to face in the same direction.

4. The digital photographing apparatus of claim 1, wherein the first display panel is coupled to the digital photographing apparatus via an elastic element.

5. The digital photographing apparatus of claim 4, wherein the elastic element is a plate spring.

6. The digital photographing apparatus of claim 1, wherein one side of the second display panel is a rotation axis and the first motion is a rotation motion in a direction around the rotation axis.

7. A digital photographing apparatus comprising:
 a first display panel which moves toward or away from a geometric plane of a rear surface of the digital photographing apparatus; and
 a second display panel which performs a first motion that moves the second display panel between a first position, where the second display panel covers the first display panel, and a second position, where the first display panel is exposed.

8. The digital photographing apparatus of claim 7, wherein the first display panel, when exposed by the second display panel moving from the first position to the second position, moves toward the geometric plane of the rear surface of the digital photographing apparatus, and the first display panel moves away from the geometric plane of the rear surface of the digital photographing apparatus when the second display panel moves from the second position to the first position.

9. The digital photographing apparatus of claim 8, wherein the second display panel performs a second motion in a generally perpendicular direction to the first motion such that a display screen of the second display panel is substantially viewable from the subject side of the digital photographing apparatus.

10. The digital photographing apparatus of claim 8, further comprising:
 a sensor for determining the position of the second display panel;
 a protruding stopper affixed to and protruding from the digital photographing apparatus, wherein the protruding stopper blocks motion, beyond a predetermined point, of the first display panel toward the geometric plane of the rear surface of the digital photographing apparatus; and
 a grooved stopper formed on the second display panel, the grooved stopper coupled to the protruding stopper to fix the second display panel at a location such that the second display panel covers the first display panel.

11. A method of controlling a digital photographing apparatus including a first display panel, and a second display panel which performs a first motion that moves the second display panel between a first position, where the second display panel covers the first display panel, and a second position, where the first display panel is exposed, the method comprising:
 determining a present mode of the digital photographing apparatus;
 determining a present position for each of the first and second display panels;
 turning "on" or "off" the first and second display panels depending at least upon the positions of the first and second display panels; and
 moving the first display panel toward or away from a geometric plane of a rear surface of the digital photographing apparatus.

12. The method of claim 11, further comprising driving the second display panel according to a default setting depending on the present mode and the present positions of the first and second display panels.

13. The method of claim 12, further comprising displaying an image on the first display panel according to a default setting depending on the present mode and the present positions of the first and second display panels.

14. The method of claim 12, further comprising receiving user input for the second display panel and driving the second display panel according to the received user input.

15. The method of claim 14, further comprising receiving user input for the first display panel and driving the first display panel according to the received user input.

16. The method of claim 15, further comprising generating a signal to turn the first and second display panels "on" or "off" in response to received user input.

17. The method of claim 11, wherein the moving step comprises moving the first display panel, when exposed by the second display panel moving from the first position to the second position, toward the geometric plane of the rear surface of the digital photographing apparatus, and moving the first display panel away from the geometric plane of the rear surface of the digital photographing apparatus when pressed by the second display panel as the second display panel moves from the second position to the first position.

18. The method of claim 17, wherein a display screen of the first display panel and a display screen of the second display panel are aligned with each other in substantially the same geometric plane when the first display panel moves toward the geometric plane of the rear surface of the digital photographing apparatus when exposed by the second display panel moving from the first position to the second position and the display screen of the first display panel and the display screen of the second display panel are oriented to face in the same direction.

* * * * *